(12) United States Patent
Liu et al.

(10) Patent No.: US 8,448,867 B2
(45) Date of Patent: May 28, 2013

(54) ILLUMINATION APPARATUS FOR AN IMAGING-BASED BAR CODE SYSTEM

(75) Inventors: Rong Liu, Selden, NY (US); Igor Vinogradov, New York, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 512 days.

(21) Appl. No.: 12/339,553

(22) Filed: Dec. 19, 2008

(65) Prior Publication Data

US 2010/0155487 A1 Jun. 24, 2010

(51) Int. Cl.
*G06K 7/10* (2006.01)
(52) U.S. Cl.
USPC ...... 235/462.42; 235/435; 235/439; 235/454; 235/462.41
(58) Field of Classification Search
USPC ............. 235/435, 439, 454, 455, 462.41, 235/462.42
See application file for complete search history.

(56) References Cited

U.S. PATENT DOCUMENTS

| | | | | |
|---|---|---|---|---|
| 4,642,459 | A * | 2/1987 | Caswell et al. | 250/227.13 |
| 5,864,128 | A * | 1/1999 | Plesko | 235/462.35 |
| 5,886,332 | A * | 3/1999 | Plesko | 235/472.01 |
| 6,273,337 | B1 * | 8/2001 | Detwiler et al. | 235/462.32 |
| 2002/0125325 | A1 * | 9/2002 | Plesko | 235/462.49 |
| 2003/0019934 | A1 * | 1/2003 | Hunter et al. | 235/462.2 |
| 2003/0062413 | A1 | 4/2003 | Gardiner et al. | |
| 2005/0011954 | A1 | 1/2005 | Hennick et al. | |
| 2007/0090193 | A1 * | 4/2007 | Nunnink et al. | 235/473 |
| 2008/0019615 | A1 * | 1/2008 | Schnee et al. | 382/313 |
| 2008/0156876 | A1 | 7/2008 | Vinogradov | |

OTHER PUBLICATIONS

International Search Report and Written Opinion dated Apr. 21, 2010 in related case PCT/US2009/068357.
International Preliminary Report on Patentability mailed on Jun. 30, 2011 in International Application No. PCT/ US2009/068357.
Office Action dated Sep. 13, 2012 in related European application 09 799 221.8-2210.

* cited by examiner

*Primary Examiner* — Daniel St.Cyr
(74) *Attorney, Agent, or Firm* — Nong-Qiang Fan

(57) ABSTRACT

An imaging-based barcode system including a scanning arrangement and an illumination apparatus is shown. The scanning arrangement includes a sensor assembly for capturing an image from a target object, the sensor assembly having a field-of-view focused by an optical arrangement onto a sensor array located within the sensor assembly. The illumination system includes a first illumination assembly and a second illumination assembly, each of the first and second assemblies including an illumination source directing illumination through a light pipe and a focusing lens to generate an illumination pattern directed towards a target object, wherein the light pipe includes an input surface and an output surface, the light pipe is configured to change the light intensity distribution at its output surface.

18 Claims, 8 Drawing Sheets

ILLUMINATION APPARATUS FOR AN IMAGING-BASED BAR CODE SYSTEM

FIELD OF THE DISCLOSURE

The present invention relates to an imaging-based bar code system and, more particularly, to an illumination apparatus for an imaging-based bar code system.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. Systems that read bar codes (bar code readers) electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Systems that read and decode bar codes employing imaging systems are typically referred to as imaging-based bar code system or bar code scanners. Imaging-based bar code systems typically employ an illumination apparatus to flood a target object with illumination from a light source, wherein the target object reflects the incident illumination back to the imaging-based bar code system. The reflected light is then focused through the imaging lens system onto the pixel array, the target object being within a field of view of the imaging lens system.

The illumination system is designed to direct a pattern of illumination light towards a target object such that the illumination pattern approximately matches the field of view (FV) of the imaging system.

The problem present in the existing illumination systems is that the intensity of illumination is greatest in a central area of the illumination pattern, while the outer or fringe areas of the illumination pattern have reduced illumination intensity, also there are abrupt changes in the illumination intensity at the transitional areas. Compounding this problem of existing illumination systems is the fact that the imaging lens system typically tends to collect and focus a greater portion of reflected light from a central area of the FV onto the pixel array than is collected and focused from the fringe areas FV. The non-uniformity of the illumination pattern combined with non-uniformity of imaging system focusing results in non-uniformity of light intensity across the pixel array. This tends to cause changes or fluctuation of the output analog signal read out from the pixel array and therefore reduces the dynamic range of the imaging system and compromises reader performance.

Accordingly, there is a need for an illumination apparatus for an imaging-based bar code system

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
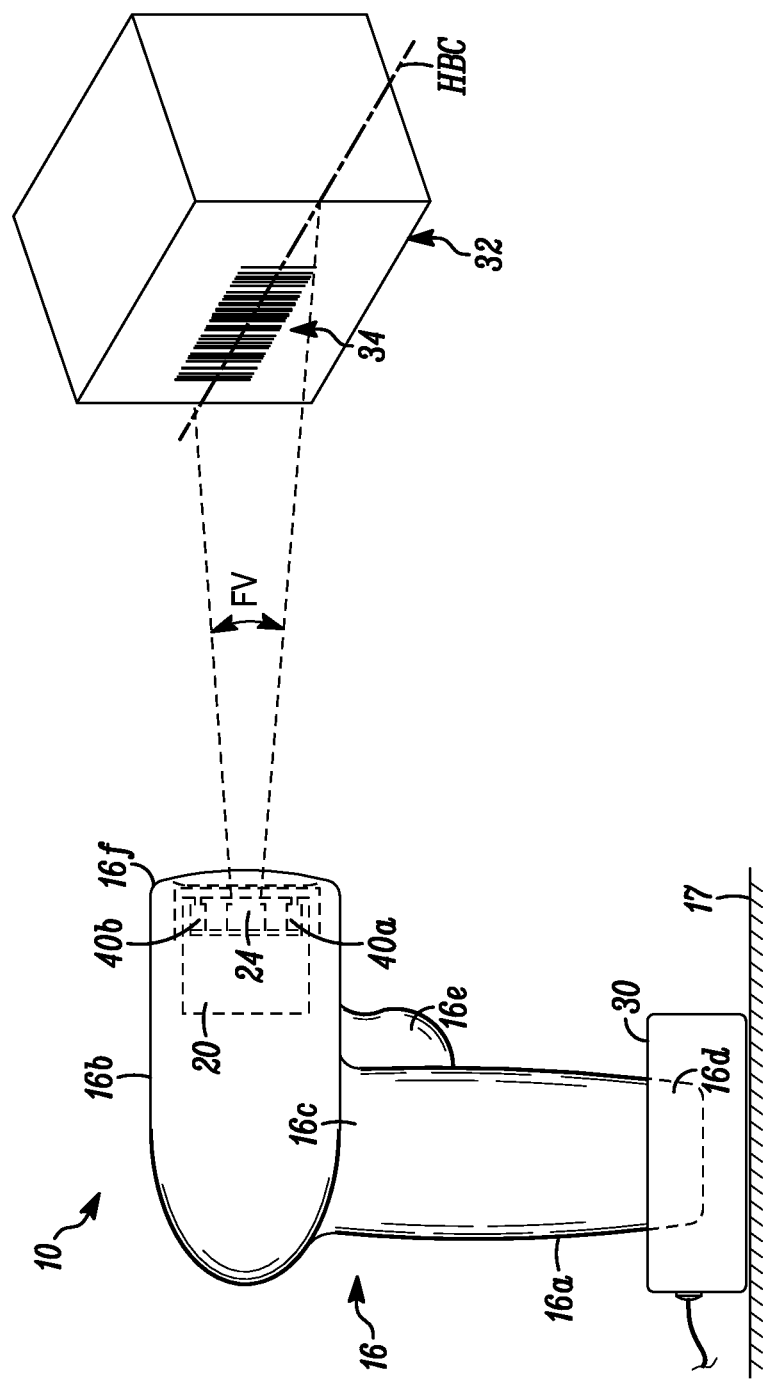
FIG. 1 is a schematic of an imaging-based bar code system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to various embodiments, an imaging-based bar code system including a scanning arrangement and an illumination apparatus is shown. The scanning arrangement includes a sensor assembly for capturing an image from a target object, the sensor assembly having a field-of-view focused by an optical arrangement onto a sensor array located within the sensor assembly. The illumination system includes a first illumination assembly and a second illumination assembly, each of the first and second assemblies including an illumination source directing illumination through a light pipe and a focusing lens to generate an illumination pattern directed towards a target object, wherein the light pipe includes an input surface and an output surface, the light pipe is configured to change the light intensity distribution at its output surface. Advantages of the various embodiments include: generating uniform illumination pattern thereby increasing the dynamic range of the imaging system and improving the performance of the bar code system. Those skilled in the art will realize that the above recognized advantages and other advantages described herein are merely illustrative and are not meant to be a complete rendering of all of the advantages of the various embodiments.

Referring now to figures, FIG. 1 is a schematic of an imaging-based bar code system 10 in accordance with some embodiments. FIG. 1 shows a hand-held bar code system 10 including a scanning arrangement and an illumination apparatus acting upon a target object 32 having a bar code 34. The bar code 34 can include but not limited to the popular bar code symbologies such as: Uniform Product Code (UPC), typically used in retail stores sales; Code 39, primarily used in inventory tracking; and Postnet, which is used for encoding zip codes for U.S. mail. Bar codes may be one dimensional (1D), i.e., a single row of graphical indicia such as a UPC bar code or two dimensional (2D), i.e., multiple rows of graphical indicia comprising a single bar code.

Returning back to the description of FIG. 1, the hand-held bar code system 10 includes a housing 16 consisting of a gripping portion 16a adapted to be grasped by an operator's hand and a forward or scanning head portion 16b extending from an upper part 16c of the gripping portion 16a. A lower part 16d of the gripping portion 16a is adapted to be received in a docking station 30 positioned on a substrate such as a table or sales counter 17. The housing 16 includes a front wall region 16f on the scanning head portion 16b. The scanning head portion 16b includes an imaging camera assembly 20 and an illumination apparatus including a first illumination assembly 40a and a second illumination assembly 40b. The imaging camera assembly 20 includes a housing 24 supporting focusing optics including one or more imaging lens and a photosensor or pixel array for capturing the image of the bar code 34 through a transparent window (not shown) present on the front wall 16f. The housing 16 also includes a trigger 16e. Imaging and decoding of the target bar code 34 is instituted by depressing the trigger 16e.

The bar code system 10 of the present invention is adapted to be used in both a hand-held mode and a fixed position mode. In the fixed position mode, the housing 16 is received in the docking station 30 and a target object 32 having a target bar code 34 is brought within the field of view (FV) of the imaging camera assembly 20 in order to have the bar code system 10 read the target bar code 34. The imaging camera assembly 20 is typically always on or operational in the fixed position mode to image and decode any target bar code 34 presented to the bat-code system 10 within the field of view (FV). The docking station 30 is plugged into an AC power source and provides regulated DC power to the bar code system 10. Thus, when the bar code system 10 is in the docking station 30 power is available to keep the imaging system 12 on continuously. In the hand-held mode, the housing 16 is removed from the docking station 30 so the barcode system 10 can be carried by an operator and positioned such that the target bar code 34 is within the field of view FV of the imaging camera assembly 20. In the hand-held mode, imaging and decoding of the target bar code 34 is instituted by the operator depressing the trigger 16e.

For the purpose of this description, a hand-held imaging-based bar code system will be discussed. However, it will be apparent to one of ordinary skill in the art that the techniques and devices described herein can be practiced advantageously with stationary or bi-optic imaging systems.

Figure 2:
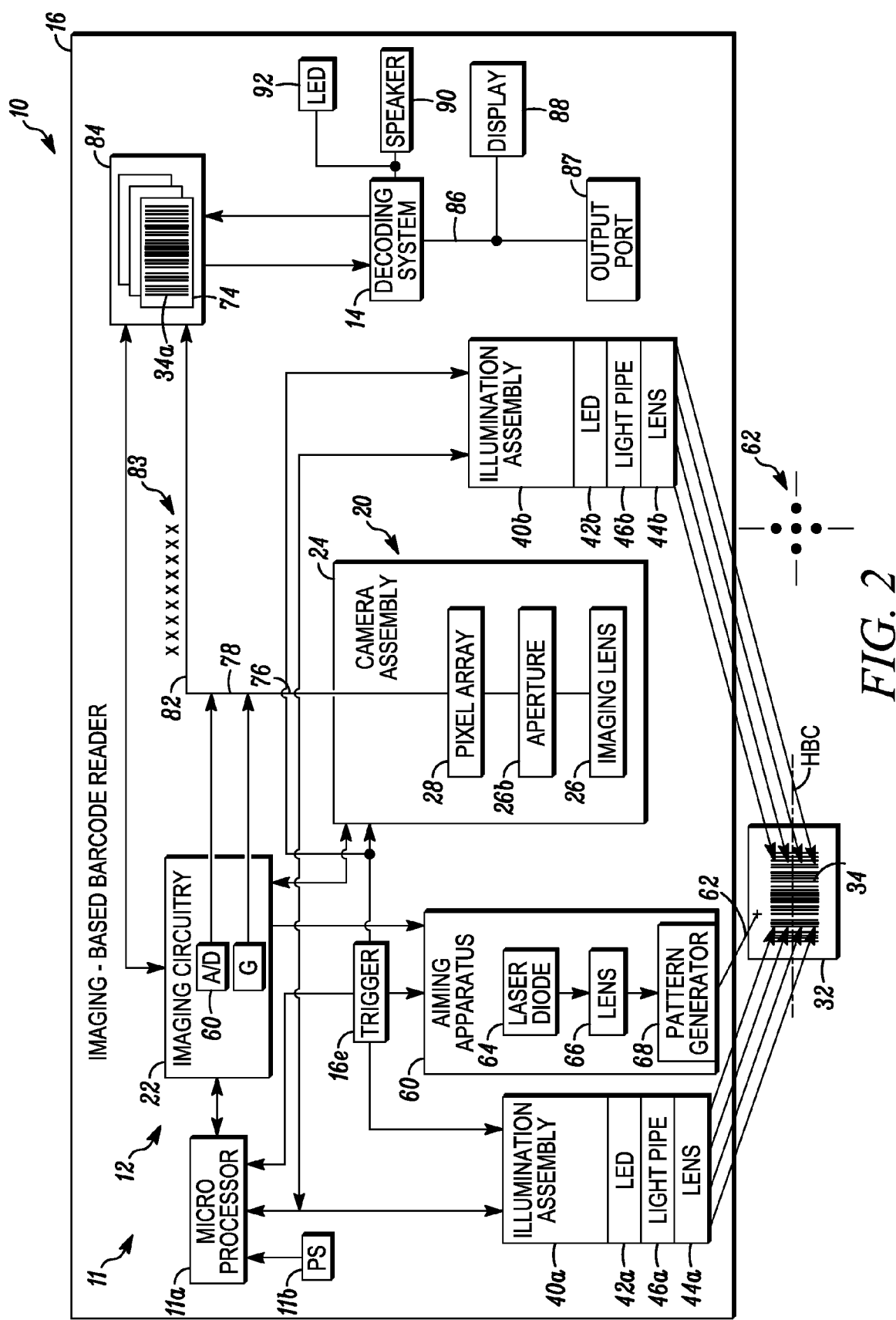
FIG. 2 is a block diagram of an imaging-based bar code system in accordance with some embodiments.

FIG. 2 is a block diagram of an imaging-based bar code system in accordance with some embodiments. The imaging-based bar code system 10 includes an imaging system 12 and a decoding system 14. The imaging system 12 is adapted to capture image frames of graphical indicia such as a bar code 34 present in a field of view (FV) of the imaging system 12 and the decoding system 14 is adapted to decode encoded indicia within a captured image frame. The imaging system 12 is part of the barcode system circuitry 11. The circuitry 11 includes a microprocessor 11a and a power supply 11b. The microprocessor 11a is used to control the operations of the imaging system 12 and the power supply is used for supplying power to the imaging and decoding systems 12, 14.

The imaging system 12 includes the imaging camera assembly 20 and an associated imaging circuitry 22. The imaging camera assembly 20 includes a housing 24 supporting focusing optics including one or more imaging lens 26, an aperture 26a, and a photosensor or pixel array 28. The imaging lens 26 focuses light reflected and scattered from the target bar code 34 through an aperture 26b onto the pixel/photosensor array 28. Thus, the imaging lens 26 focuses an image of the target bar code 34 (assuming it is within the field of view FV) onto the array of pixels comprising the pixel array 28, thereby enabling the pixel array 28 to capture an image of a target object 32 within a field of view FV of the imaging system 12 during an exposure period. The field of view (FV) of the imaging system 12 includes both a horizontal (shown in FIG. 1) and a vertical (not shown) field of view. The field of view FV of the imaging system 12 is a function of both the configuration of the sensor array 28 and the optical characteristics of the imaging lens 26 and the distance and orientation between the array 28 and the imaging lens 26.

Further, the imaging system 12 includes, but not limited to, a linear or one dimensional imaging system and the photosensor array 28 includes, but not limited to, a linear or 1D sensor array. The sensor array 28 includes such as but not limited to a charged coupled device (CCD), a complementary metal oxide semiconductor (CMOS), or other imaging pixel array, operating under the control of the imaging circuitry 22. The number of pixels in the row typically would be 512, 1024, 2048 or 4096 pixels. The typical size of a pixel in the pixel array would be on the order of 7 microns in horizontal width× 120 microns in vertical height. The linear sensor array 28 is primarily adapted to image 1D bar codes, such as, a UPC bar code as shown in FIG. 1 which extends along a horizontal axis HBC and includes one row of indicia, an array of dark bars and white spaces. However, one of skill in the art would recognize that the present invention is also applicable to imaging systems utilizing a 2D photosensor array to image 2D bar codes, postal codes, signatures, etc.

Referring back to FIG. 2, the bar code system 10 includes an aiming system 60 to generate a visible aiming pattern 62 to aid the operator in aiming the bar code system 10 at the target bar code 34 when used in the hand-held mode and an illumination apparatus or system comprising first and second illumination assemblies 40a and 40b to illuminate the target bar code 34. The aiming system 60 generates the visible aiming pattern 62 comprising a single dot of illumination, a plurality of dots and/or lines of illumination or overlapping groups of dots/lines of illumination. The aiming system 60 typically includes a laser diode 64, a focusing lens 66 and a pattern generator 68 for generating the desired aiming pattern 62.

The illumination apparatus is described in detail below with reference to FIGS. 3, 6A, 6B, 6C, 8, 10, and 11. The illumination from the illumination assemblies 40a and 40b is reflected by the target bar code 34. The reflected light then passes through the imaging lens 26 and is focused onto the sensor array 28 of the imaging system 12. The pixel array 28 generates an analog electrical signal 76 by reading out some or all of the pixels of the pixel array 28 after an exposure period. In some sensors, particularly CMOS sensors, all pixels of the pixel array 28 are not exposed at the same time, thus, reading out of some pixels may coincide in time with an exposure period for some other pixels.

The analog signal 76 represents a sequence of photosensor voltage values, the magnitude of each value representing an intensity of the reflected light received by a photosensor/pixel during an exposure period. The analog signal 76 is amplified by a gain factor of the imaging circuitry 22, generating an amplified analog signal 78. The amplified analog signal 78 is then digitized by the A/D converter 80 of the imaging circuitry 22 generating a digitized signal 82. The digitized signal 82 comprises a sequence of digital gray scale values 83 typically ranging from 0-255 (for an eight bit processor, i.e., $2^8=256$), where a 0 gray scale value would represent an absence of any reflected light received by a pixel during an exposure or integration period (characterized as low pixel brightness) and a 255 gray scale value would represent a very high intensity of reflected light received by a pixel during an exposure period (characterized as high pixel brightness).

The digitized gray scale values 83 of the digitized signal 82 are stored in a memory 84. The digitized gray scale values 83 corresponding to a read out of the pixel array 28 constitute the image frame 74, which is representative of the image projected by the imaging lens 26 onto the pixel array 28 during an exposure period. If the field of view FV of the imaging lens 26 includes the target bar code 34, then a digital gray scale value image 34*a* of the target bar code 34 would be present in the image frame 74. Further, the digitized gray scale values 83 can be sent to the decoding system 14 to obtain the data represented by the bar code 34.

The decoding system 14 operates on the digitized gray scale values 83 of the image frame 74 and attempts to decode any decodable image within the image frame, e.g., the imaged target bar code 34*a*. If the decoding is successful, decoded data 86, representative of the data/information coded in the bar code 34 is then output via a data output port 87 and/or displayed to the user of the bar code system 10 via a display 88. Upon achieving a good "read" of the bar code 34, that is, the bar code 34 was successfully imaged and decoded, a speaker 90 and/or an indicator LED 92 is activated by the bar code circuitry 11 to indicate to the user that the target bar code 34 has successfully read, that is, the target bar code 34 has been successfully imaged and the imaged bar code 34*a* has been successfully decoded. If decoding is unsuccessful, a successive image frame 74 is selected and the decoding process is repeated until a successful decode is achieved.

The imaging and decoding systems 12, 14 of the present invention may be embodied in hardware, software, electrical circuitry, firmware embedded within the microprocessor 11*a* or the imaging camera assembly 20, on a flash read only memory (ROM), on an application specific integrated circuit (ASIC), or any combination thereof.

Figure 3:
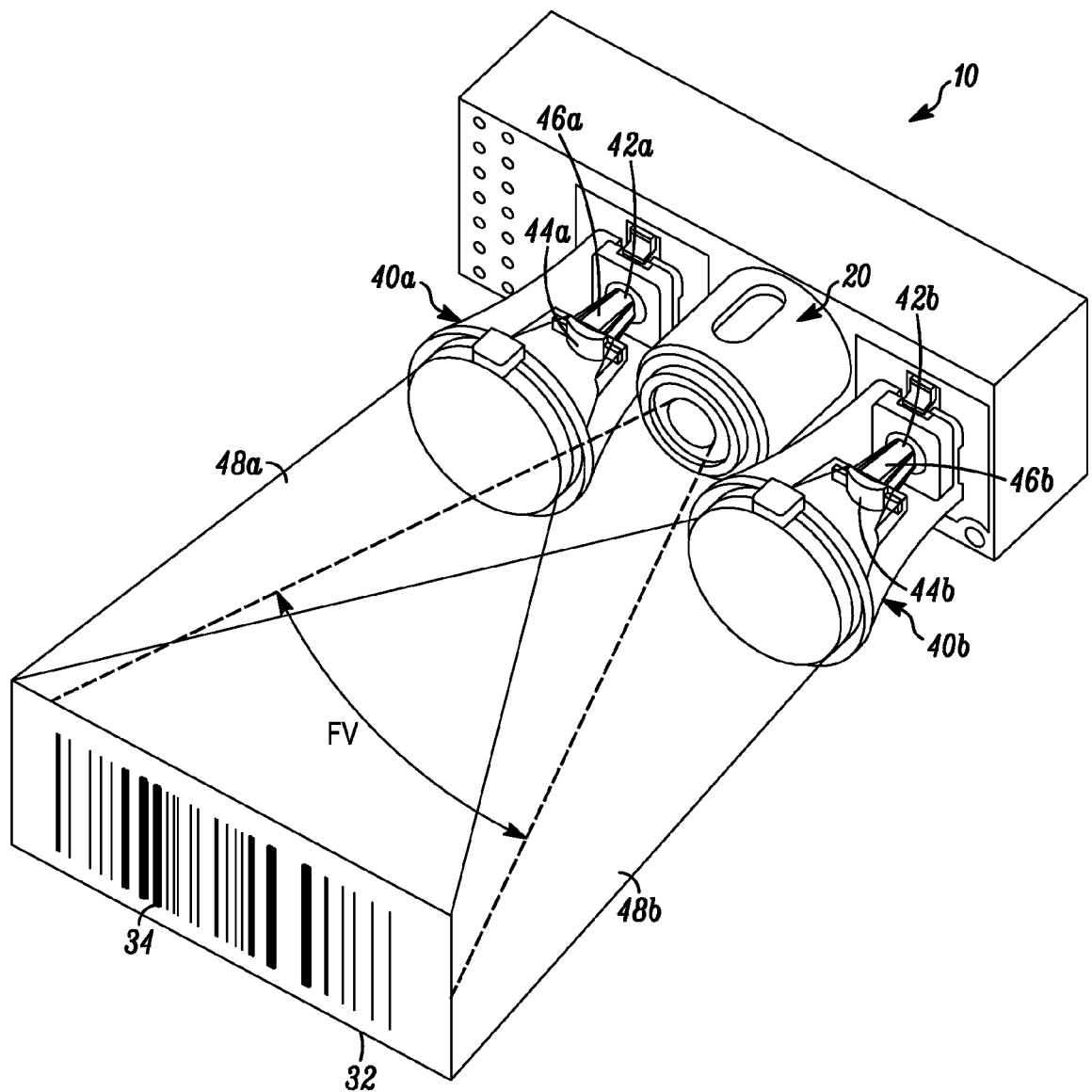
FIG. 3 illustrates the projection of an illumination field from an illumination assembly onto a sensor field-of-view in accordance with some embodiments.

FIG. 3 illustrates the projection of an illumination field from an illumination assembly onto a sensor field-of-view in accordance with some embodiments. The imaging-based bar code system 10 includes first and second illumination assemblies 40*a*, 40*b* placed on either side of the imaging camera assembly 20. Each illumination assembly 40*a*, 40*b* includes an illumination source 42*a*, 42*b* such as, but not limited to a light emitting diode (LED), an optical light pipe 46*a*, 46*b* such as, but not limited to, a cylindrical light pipe, and a focusing lens 44*a*, 44*b* such as, but not limited to, a convex lens. The convex lens can include, but not limited to, a spherical, an aspherical or a toroidal convex lens. The light pipe 46*a*, 46*b* includes an input surface 461*a*, 461*b* and an output surface 462*a*, 462*b*, wherein the input surface 461*a*, 461*b* is smaller in size as compared to the output surface 462*a*, 462*b*. Further, the input surface 461*a*, 461*b* is juxtaposed with the illumination source 42*a*, 42*b* and the output surface 462*a*, 462*b* faces the focusing lens 44*a*, 44*b*. The illumination source 42*a*, 42*b* directs illumination through the light pipe 46*a*, 46*b* and the focusing lens 44*a*, 44*b* to generate an illumination pattern 48*a*, 48*b* directed towards a target object 32 including a target bar code 34. The illumination fields 48*a*, 48*b* are generated such as to illuminate the target bar code 34 in the field of view (FV) of the imaging camera assembly 20.

Figure 4:
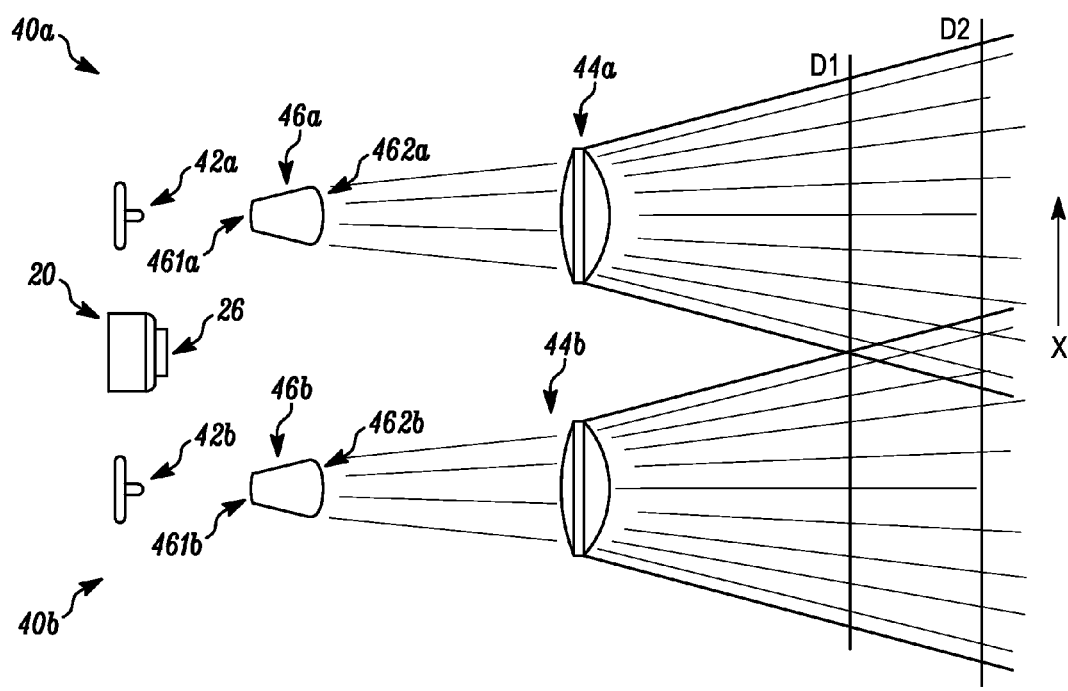
FIG. 4 is a schematic perspective view of an illumination apparatus in accordance with the existing system.

FIG. 4 is a schematic perspective view of an illumination apparatus in accordance with an existing system. The illumination apparatus includes a first illumination assembly 40*a* and a second illumination assembly 40*b* as described above in FIG. 3. The illumination from the illumination source 42*a*, 42*b* is directed through the light pipe 46*a*, 46*b* and the focusing lens 44*a*, 44*b* to generate an illumination pattern towards a target object 32 (such as shown in FIGS. 1-3). The generated illumination pattern is explained with reference to FIG. 5.

Figure 5:
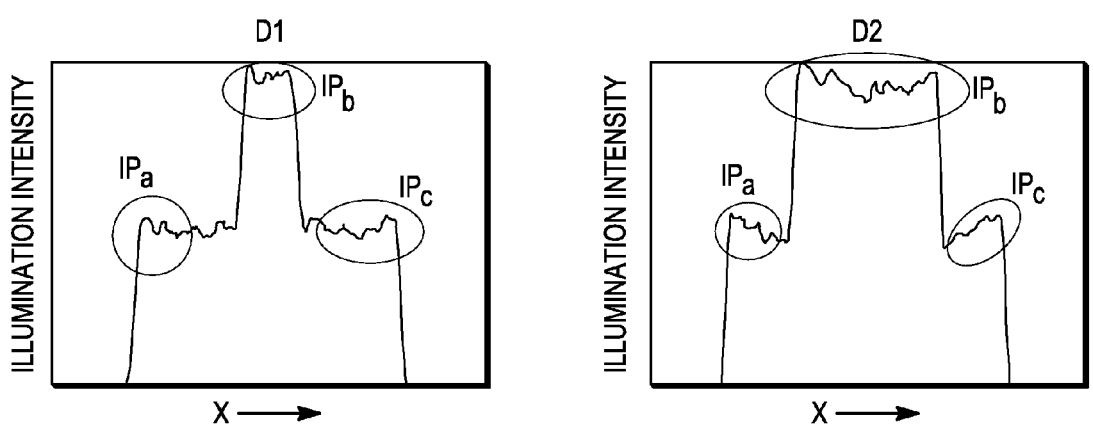
FIG. 5 is a graph of illumination intensity as a function of horizontal position along a horizontal axis of the illumination pattern generated by the illumination apparatus of FIG. 4.

FIG. 5 is a graph of illumination intensity as a function of horizontal position along a horizontal axis of the illumination pattern generated by the illumination apparatus of FIG. 4 at two different distances D1 and D2 between the bar code system 10 and the target bar code 34. As can be seen in FIG. 5, the light is distributed substantially non-uniformly over the field of view with abrupt changes in the illumination intensity at the transition area such that the illumination intensity of the horizontal edge portions IPa, IPc are less compared to the illumination intensity of central portion IPb. Therefore, the peripheral portions IPa, IPc are dark because of lesser illumination intensity as compared to the central portion IPb, of the illumination pattern IP. The non-uniform light distribution affects the decodability of the bar code system 10 and hence reduces the dynamic range of the bar code system 10. Therefore there is a need for an illumination apparatus to generate a uniform illumination pattern.

Figure 7:
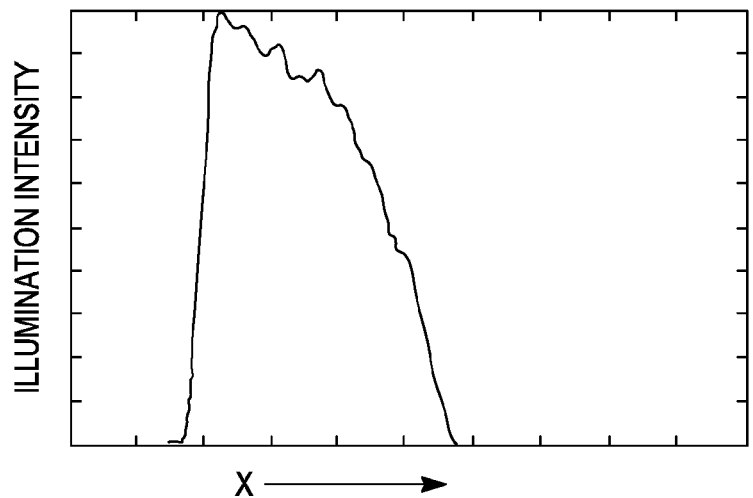
FIG. 7 is a graph of illumination intensity as a function of horizontal position along a horizontal axis of the illumination pattern generated by the single illumination assembly as shown in one of FIGS. 6A, 6B, and 6C.

The proposed imaging-based barcode system 10 includes an illumination apparatus including a first illumination assembly 40*a* and a second illumination assembly 40*b*, wherein the first and second illumination assemblies includes an illumination source 42 directing illumination through a light pipe 46 and a focusing lens 44 to generate an illumination pattern directed towards a target object. The light pipe 46 is cylindrical in shape and consists of an input surface 461 and an output surface 462 and is configured to change the light intensity distribution at its output surface 462 such as to generate an gradient illumination distribution pattern (as shown in FIG. 7) to be projected towards a target object 32. The gradient illumination distribution pattern can be obtained by configuring the light pipe 46 to have either the input surface 461 or the output surface 462 as a non-rotationally symmetrical surface with respect to an optical axis of the illumination assembly and the focusing lens 44*b* of the second illumination assembly 40*b* to project the image of the output surface of the light pipe 46*a* of the first illumination assembly 40*a* on the plane of the barcode 34. The light pipe 46 can also be configured to have either the input surface 461 or the output surface 462 as a rotationally symmetrical surface tilted with respect to the optical axis of the illumination assembly to obtain the gradient illumination distribution pattern. The gradient illumination distribution pattern can also be obtained by tilting or decentering the axis of the focusing lens 44 with respect to the optical axis of the illumination assembly 40.

Figure 6A:
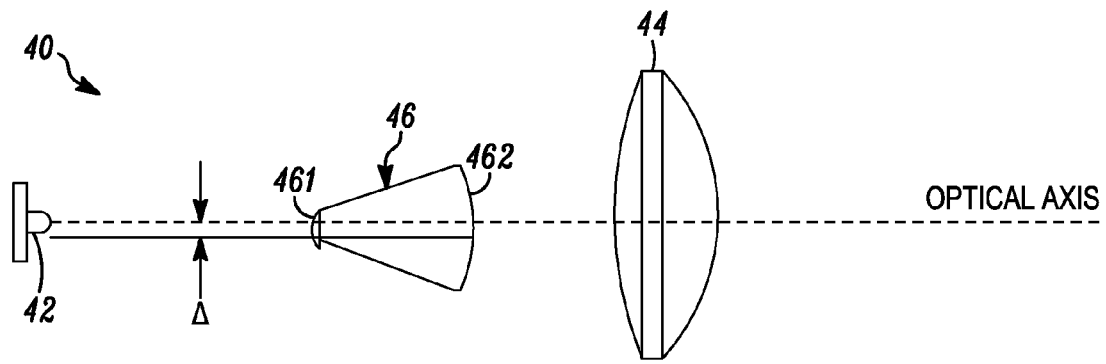
FIG. 6A is a schematic perspective view of a single illumination assembly in accordance with one embodiment.

FIG. 6A is a schematic perspective view of a single illumination assembly in accordance with one embodiment. The illumination assembly 40 includes the light pipe 46 configured such that the input surface 461 is a polynomial surface such as, but not limited to, a cylindrical surface, a spherical surface, or a toroidal surface, decentered with respect to the optical axis of the illumination assembly and the output surface 462 is a spherical surface. The decentered input surface 461 alters the illumination from the illumination source 42 by acting as a field lens that maps and redistributes the illumination from the illumination source to a numerical aperture (not shown) of the focusing lens 44 such that a plurality of altered illumination intensities can be superimposed to achieve high uniformity. The high uniformity can also be achieved by tilling the input surface 461 of the light pipe 46 with respect to the optical axis of the illumination assembly. FIG. 6A also shows the amount Δ by which the input surface 461 of the light pipe 46 is decentered with respect to the optical axis of the illumination assembly 40.

Figure 6B:
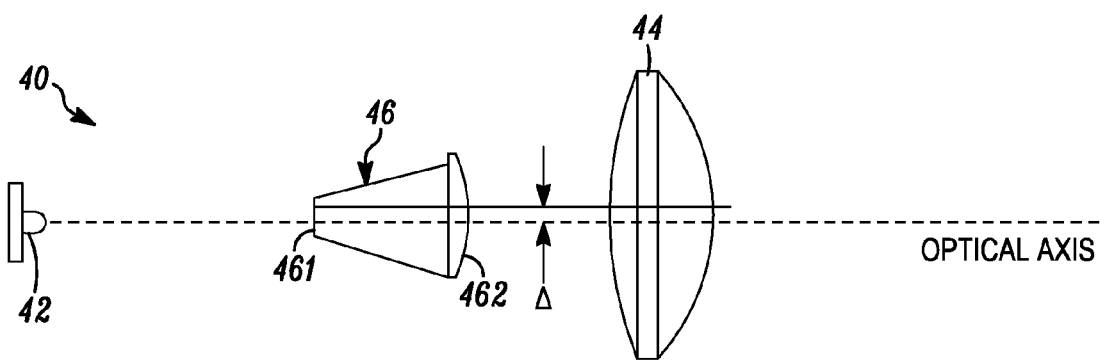
FIG. 6B is a schematic perspective view of a single illumination assembly in accordance with another embodiment.

FIG. 6B is a schematic perspective view of a single illumination assembly in accordance with another embodiment. The illumination assembly 40 includes the light pipe 46 configured such that the output surface 462 is a polynomial surface such as but not limited to a cylindrical surface, a spherical surface, or a toroidal surface, decentered with respect to the optical axis of the illumination assembly 40 and the input surface 461 is a spherical surface. The decentered output surface 462 alters the illumination from the illumination source 42 by acting as a field lens that maps and redistributes the illumination from the illumination source to a numerical aperture (not shown) of the focusing lens 44 such that a plurality of altered illumination intensities can be superimposed to achieve high uniformity. The high uniformity can also be achieved by tilting the output surface 462 of the light pipe 46 with respect to the optical axis of the illumination assembly. FIG. 6B also shows the amount Δ by which the output surface 462 of the light pipe 46 is decentered with respect to the optical axis of the illumination assembly 40.

Figure 6C:
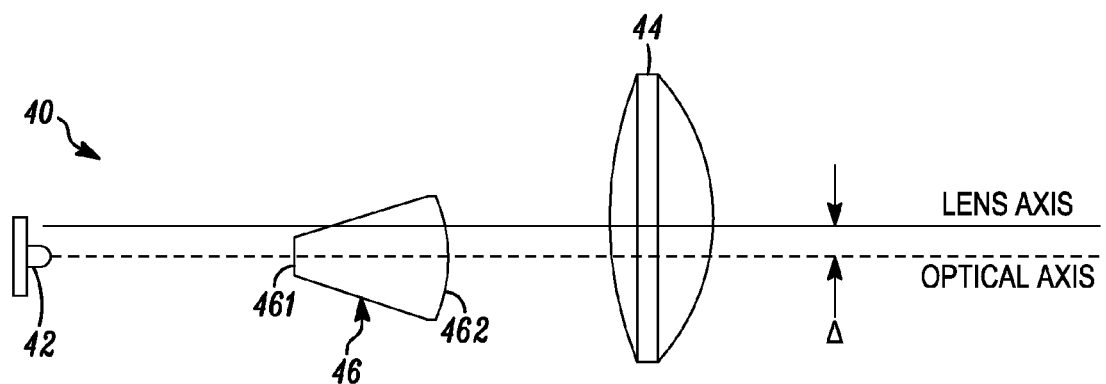
FIG. 6C is a schematic perspective view of a single illumination assembly in accordance with one another embodiment.

FIG. 6C show a schematic perspective view of a single illumination assembly in accordance with one another embodiment. The illumination assembly 40 includes the focusing lens 44 configured such that the lens axis is tilted or decentered with respect to the optical axis of the illumination assembly 40. The tilted or decentered focusing lens 44 creates a lateral translation of the illumination light from the illumination source 42. This lateral translation of the illumination light eliminates parallax at the plane of the barcode when illumination from a plurality of illumination assemblies is superimposed. Further, FIG. 6C also shows the amount Δ by which the lens axis (axis of the focusing lens 44) is decentered from the optical axis of the illumination assembly 40.

FIG. 7 is a graph of illumination intensity as a function of horizontal position along a horizontal axis of the illumination pattern generated by the illumination assembly as shown in one of FIGS. 6A, 6B, and 6C. As can be seen in FIG. 7, the light is distributed such that there is high illumination intensity on one side and gradually attenuated illumination intensity on the other side. This gradual change in illumination intensity reduces abrupt transitions from high illumination intensity to low illumination intensity within the field of view (FV) of the imaging camera assembly.

Figure 8:
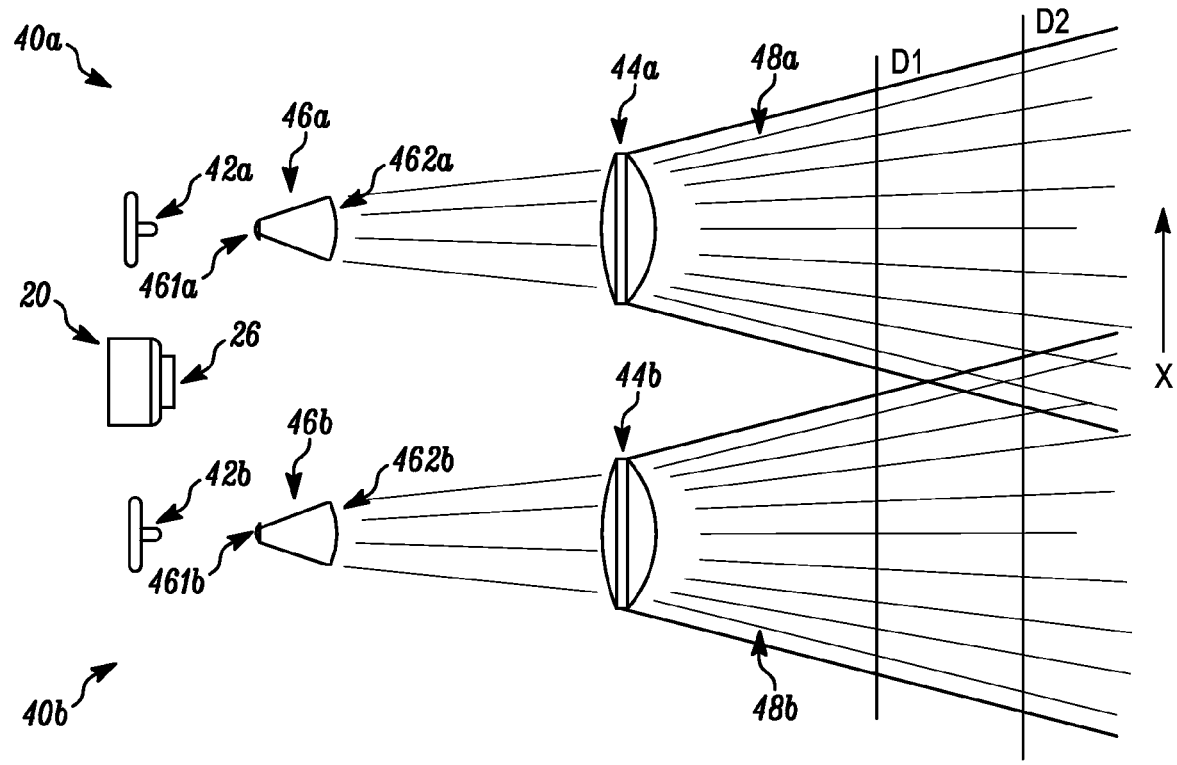
FIG. 8 is a schematic perspective view of an illumination apparatus in accordance with some embodiments.

FIG. 8 is a schematic perspective view of an illumination apparatus including a first illumination assembly 40a and a second illumination assembly 40b in accordance with some embodiments. The first and the second illumination assemblies are configured as mentioned above in FIG. 6A.

Figure 9:
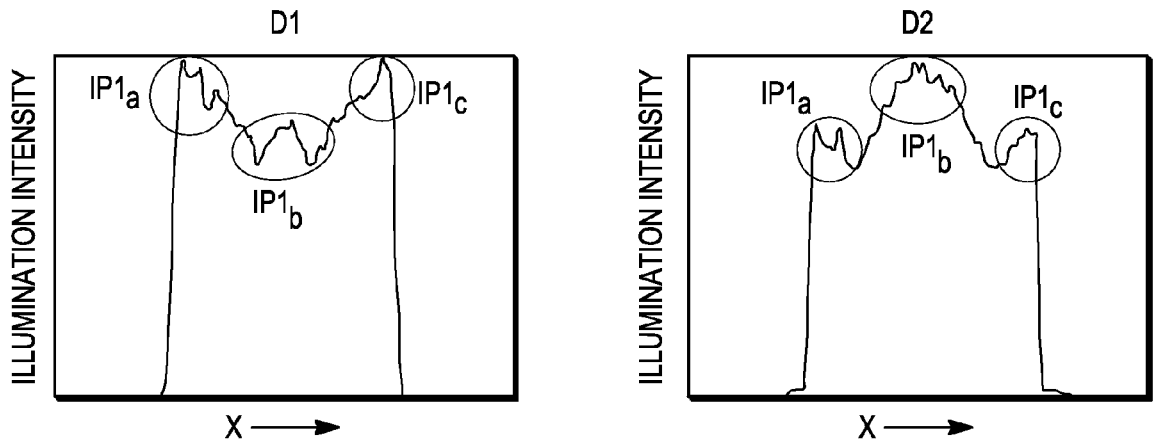
FIG. 9 is a graph of illumination intensity as a function of horizontal position along a horizontal axis of the illumination pattern generated by the illumination apparatus of FIG. 8.

FIG. 9 is a graph of illumination intensity as a function of horizontal position along a horizontal axis of the illumination pattern generated by the illumination apparatus of FIG. 8 at two different distances D1 and D2 between the bar code system 10 and the target bar code 34. As can be seen in FIG. 9, the light is distributed substantially uniformly over the field of view with smooth changes in the illumination intensity at the transition area i.e., area between horizontal edge portion IP1a, IP1c having a high illumination intensity and central portion IP1b having a lower illumination intensity. Further, as illustrated in FIG. 9 these changes in the illumination intensity levels are gradual as compared to abrupt transitions between illumination levels as shown in FIG. 5.

Figure 10:
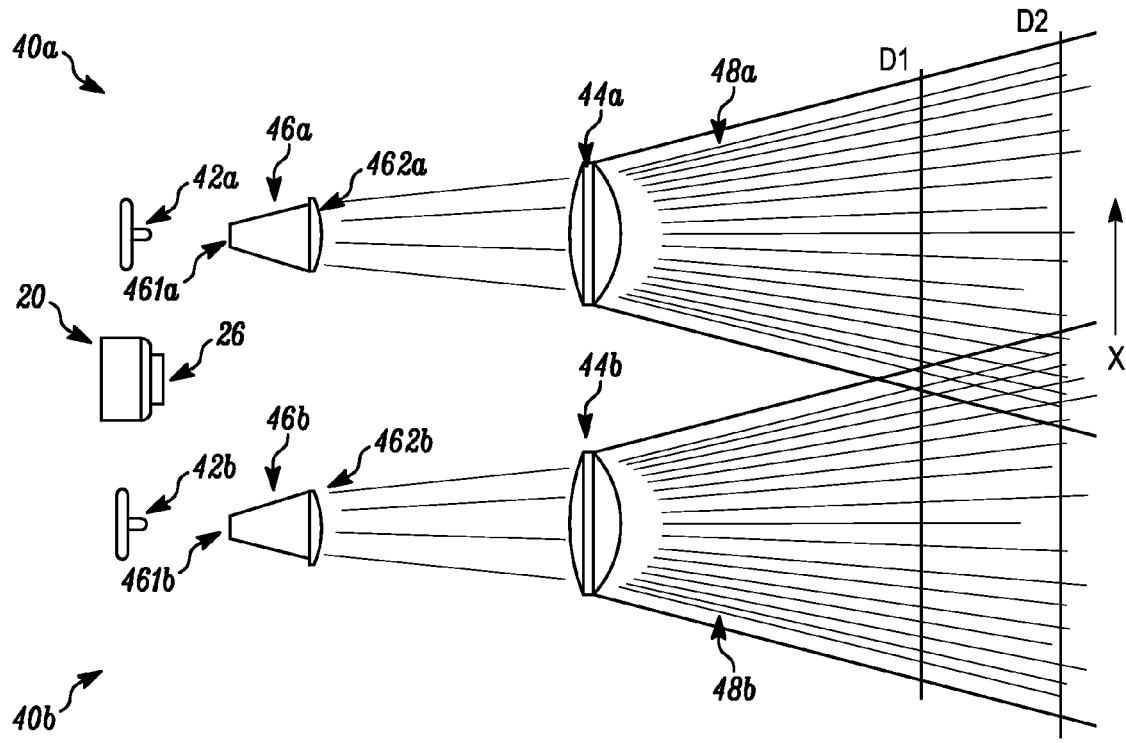
FIG. 10 is a schematic perspective view of an illumination apparatus in accordance with some embodiments.

FIG. 10 is a schematic perspective view of an illumination apparatus including a first illumination assembly 40a and a second illumination assembly 40b in accordance with some embodiments. The first and the second illumination assemblies are configured as mentioned above in FIG. 6B.

Figure 11:
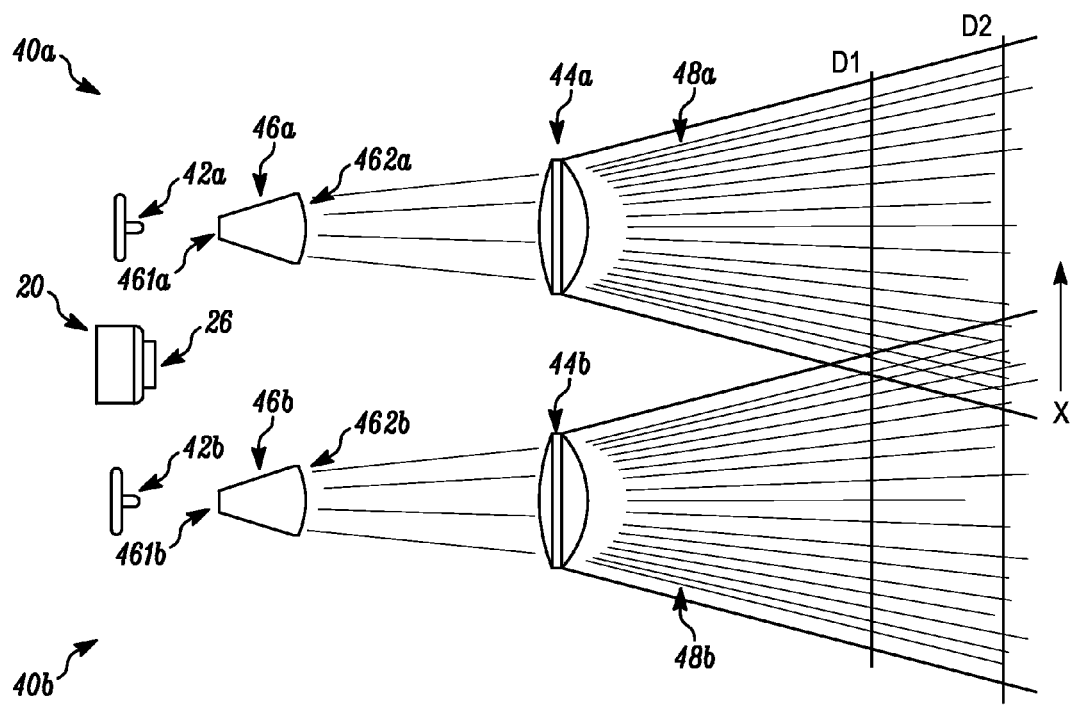
FIG. 11 is a schematic perspective view of an illumination apparatus in accordance with some embodiments.

FIG. 11 is a schematic perspective view of an illumination apparatus including a first illumination assembly 40a and a second illumination assembly 40b in accordance with some embodiments. The first and the second illumination assemblies are configured as mentioned above in FIG. 6C.

Figure 12:
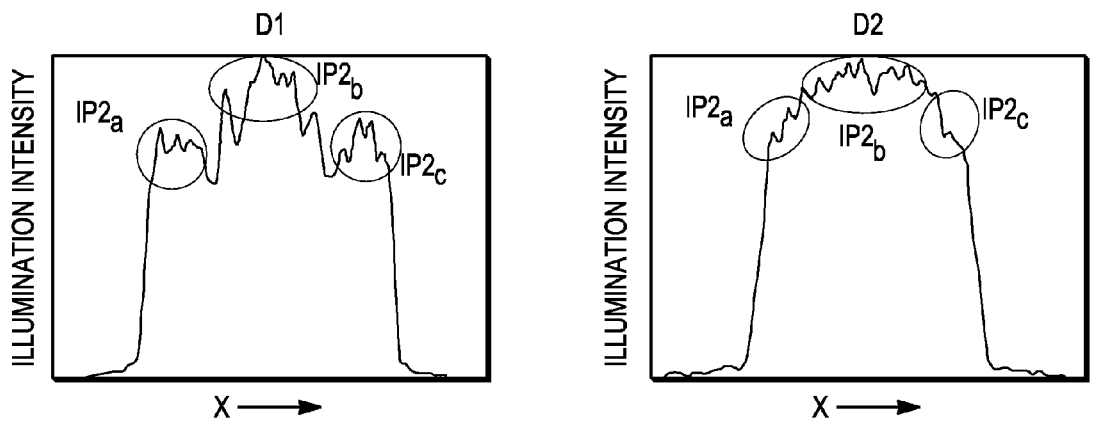
FIG. 12 is a graph of illumination intensity as a function of horizontal position along a horizontal axis of the illumination pattern generated by the illumination apparatus of one of FIGS. 10 and 11.

FIG. 12 is a graph of illumination intensity as a function of horizontal position along a horizontal axis of the illumination pattern generated by the illumination apparatus of one of FIGS. 10 and 11 at two different distances D1 and D2 between the bar code system 10 and the target bar code 34. As can be seen in FIG. 12, the light is distributed substantially uniformly over the field of view with changes in the illumination intensity at the transition area i.e., area between horizontal edge portion IP1a, IP1c having low illumination intensity and central portion IP1b having high illumination intensity. Further, as illustrated in FIG. 12 these changes in the illumination intensity are very smooth i.e., there is a gradual change in the illumination intensity levels as compared to abrupt transitions in the illumination intensity levels as shown in FIG. 5. In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It with be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An imaging-based bar code system comprising:
   a scanning arrangement comprising a sensor assembly for capturing an image from a target object, the sensor assembly having a field-of-view focused by an optical arrangement onto a sensor array located within the sensor assembly;
   an illumination system comprising a first illumination assembly and a second illumination assembly, each of the first and second assemblies including an illumination source directing illumination through a light pipe and a focusing lens to generate an illumination pattern directed towards a target object, wherein the light pipe comprises an input surface and an output surface, the light pipe is configured to change the light intensity distribution at its output surface;
   wherein the light pipe in the first illumination assembly is configured to change the illumination from the illumination source to generate through the focusing lens in the first illumination assembly a first illumination distribution pattern that is essentially reflectively asymmetrical with respect to a vertical plane located on an optical axis of the focusing lens in the first illumination assembly, wherein the first illumination distribution pattern includes a first gradient illumination distribution pattern with light intensity changing along a horizontal direction;
   wherein the light pipe in the second illumination assembly is configured to change the illumination from the illumination source to generate through the focusing lens in the second illumination assembly a second illumination distribution pattern that is essentially reflectively asymmetrical with respect to a vertical plane located on an optical axis of the focusing lens in the second illumination assembly, wherein the second illumination distribution pattern includes a second gradient illumination distribution pattern with light intensity changing along the horizontal direction; and
   wherein the first gradient illumination distribution pattern and the second gradient illumination distribution pattern are combined to form an improved illumination distribution pattern within the field-of-view by compensating an increase of light intensity of the first gradient illumination distribution pattern with a decrease of light intensity of the second gradient illumination distribution pattern.

2. The imaging-based bar code system of claim 1, wherein the focusing lens of the second illumination assembly is configured to project the image of the output surface of the light pipe of the first illumination assembly on the plane of the barcode.

3. The imaging-based bar code system of claim 1, wherein the first, illumination assembly and the second illumination assembly are placed on the sides of the scanning arrangement.

4. The imaging-based bar code system of claim 1, wherein the light pipe is configured such that the input surface is smaller in size as compared to the output surface, and wherein the input surface is juxtaposed with the illumination source and the output surface faces the focusing lens.

5. The imaging-based bar code system of claim 4, wherein either the input surface or the output surface is a non-rotationally symmetrical surface with respect to the optical axis and wherein either the input surface or the output surface is tilted with respect to the optical axis.

6. The imaging-based bar code system of claim 4, wherein either the input surface or the output surface is a rotationally symmetrical surface, and wherein either the input surface or the output surface is tilted with respect to the optical axis.

7. The imaging-based bar code system of claim 4, wherein either the input surface or the output surface is a non-rotationally symmetrical surface, and wherein either the input surface or the output surface is decentered with respect to the optical axis.

8. The imaging-based bar code system of claim 4, wherein either the input surface or the output surface is a rotationally symmetrical surface, and wherein either the input surface or the output surface is decentered with respect to the optical axis, a scanning arrangement comprising a sensor assembly for capturing an image from a target object, the sensor assembly having a field-of-view focused by an optical arrangement onto a sensor array located within the sensor assembly.

9. The imaging-based bar code system of claim 1, wherein the gradient illumination distribution pattern comprises high illumination intensity on one side and gradually attenuated illumination intensity on the other side.

10. An imaging-based bar code system comprising:
   a scanning arrangement comprising a sensor assembly for capturing an image from a target object, the sensor assembly having a field-of-view focused by an optical arrangement onto a sensor array located within the sensor assembly;
   an illumination system comprising a first illumination assembly and a second illumination assembly, each of the first and second assemblies including an illumination source directing illumination through a light pipe and a focusing lens to generate an illumination pattern directed towards a target object, wherein an axis of the focusing lens is tilted from an optical axis of the illumination assembly; and
   wherein the light pipe in the first illumination assembly is configured to change the illumination from the illumination source to generate through the focusing lens in the first illumination assembly a first illumination distribution pattern that is essentially reflectively asymmetrical with respect to a vertical plane located on an optical axis of the focusing lens in the first illumination assembly, wherein the first illumination distribution pattern includes a first gradient illumination distribution pattern with light intensity changing along a horizontal direction;
   wherein the light pipe in the second illumination assembly is configured to change the illumination from the illumination source to generate through the focusing lens in the second illumination assembly a second illumination distribution pattern that is essentially reflectively asymmetrical with respect to a vertical plane located on an optical axis of the focusing lens in the second illumination assembly, wherein the second illumination distribution pattern includes a second gradient illumination distribution pattern with light intensity changing along the horizontal direction; and
   wherein the first gradient illumination distribution pattern and the second gradient illumination distribution pattern are combined to form an improved illumination distribution pattern within the field-of-view by compensating an increase of light intensity of the first gradient illumination distribution pattern with a decrease of light intensity of the second gradient illumination distribution pattern.

11. The imaging-based bar code system of claim 10, wherein the axis of the focusing lens is tilted from the optical axis of the illumination assembly to laterally translate the illumination from the illumination source.

12. The imaging-based bar code system of claim 10, wherein an axis of the focusing lens is decentered with respect to the optical axis of the illumination assembly, to laterally translate the illumination from the illumination source.

13. The imaging-based bar code system of claim 10, wherein the focusing lens is rotationally symmetrical with respect to the optical axis.

14. The imaging-based bar code system of claim 10, wherein the focusing lens is non-rotationally symmetrical with respect to the optical axis.

15. An imaging-based bar code system comprising:
   a scanning arrangement comprising a sensor assembly for capturing an image from a target object, the sensor assembly having a field-of-view focused by an optical arrangement onto a sensor array located within the sensor assembly;
   means for generating a uniform illumination distribution with a plurality of illumination assemblies, each one of the plurality of illumination assemblies including an illumination source directing illumination through a light pipe and a focusing lens to project the illumination onto a target object;
   wherein said means for generating comprises means for generating a first illumination distribution pattern that is essentially reflectively asymmetrical with respect to a vertical plane located on an optical axis of the focusing lens in the first illumination assembly, wherein the first illumination distribution pattern includes a first gradient illumination distribution pattern with light intensity changing along a horizontal direction;
   wherein said means for generating also comprises means for generating a second illumination distribution pattern that is essentially reflectively asymmetrical with respect to a vertical plane located on an optical axis of the focusing lens in the second illumination assembly, wherein the second illumination distribution pattern includes a second gradient illumination distribution pattern with light intensity changing along the horizontal direction; and
   wherein said means for generating further comprises means for combining a first gradient illumination distribution pattern and a second gradient illumination pattern by compensating an increase of light intensity of the first gradient illumination distribution pattern with a decrease of light intensity of the second gradient illumination distribution pattern.

16. The imaging-based bar code system of claim 15, wherein the illumination source is an LED.

17. The imaging-based bar code system of claim 15, wherein the focusing lens is a convex lens.

18. The imaging-based bar code system of claim 15, wherein the sensor array is a 2D sensor array and the target object is a 2D bar code.

* * * * *